No. 772,285. PATENTED OCT. 11, 1904.
J. MILLARD.
PHOTOGRAPHIC CAMERA.
APPLICATION FILED JULY 17, 1903.
NO MODEL. 2 SHEETS—SHEET 1.

WITNESSES:
F. W. Wright
E. W. Collins

INVENTOR
James Millard
BY
Howson and Howson
HIS ATTORNEYS.

No. 772,285. PATENTED OCT. 11, 1904.
J. MILLARD.
PHOTOGRAPHIC CAMERA.
APPLICATION FILED JULY 17, 1903.
NO MODEL. 2 SHEETS—SHEET 2.
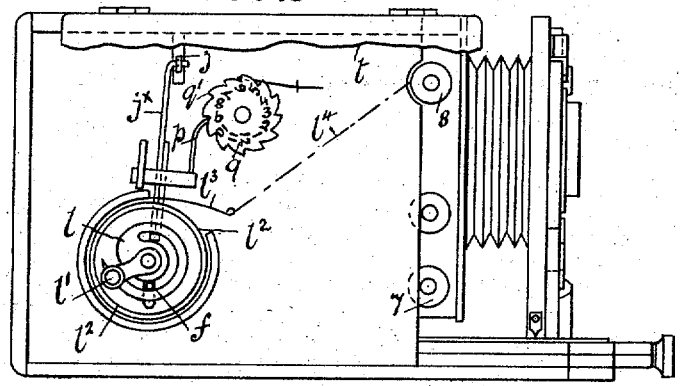
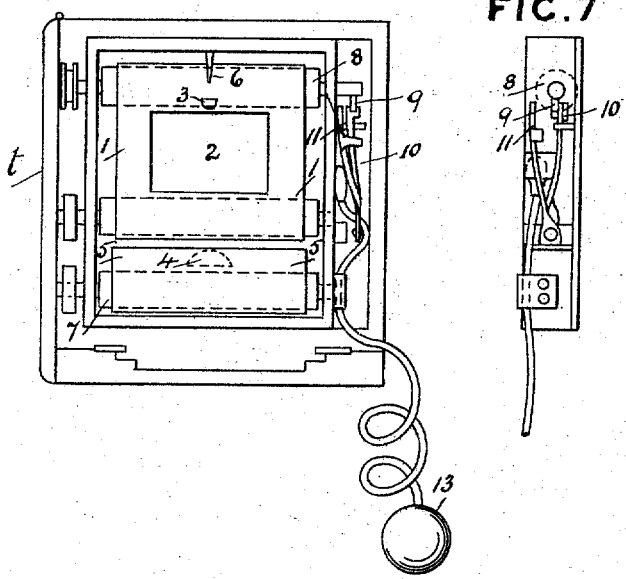
WITNESSES:
G. W. Wright
E. W. Collins
INVENTOR
James Millard
BY
Howson and Howson
HIS ATTORNEYS.

No. 772,285.

Patented October 11, 1904.

UNITED STATES PATENT OFFICE.

JAMES MILLARD, OF WIGAN, ENGLAND.

PHOTOGRAPHIC CAMERA.

SPECIFICATION forming part of Letters Patent No. 772,285, dated October 11, 1904.

Application filed July 17, 1903. Serial No. 166,041. (No model.)

*To all whom it may concern:*

Be it known that I, JAMES MILLARD, a subject of the King of Great Britain and Ireland, residing at Newtown, Wigan, in the county of Lancaster, England, have invented new and useful Improvements in Photographic Cameras, of which the following is a specification.

The improvements which form the subject of this invention relate principally to magazine or hand cameras; but parts of my invention are alike applicable to Kinear, studio, and other cameras.

Figure 1:
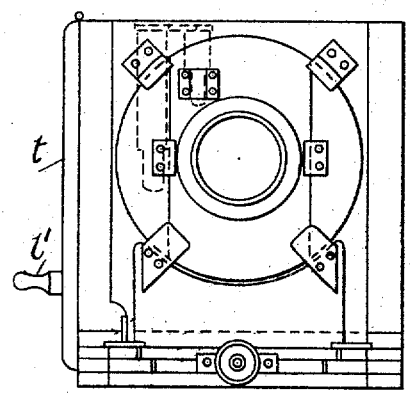
Figure 2:
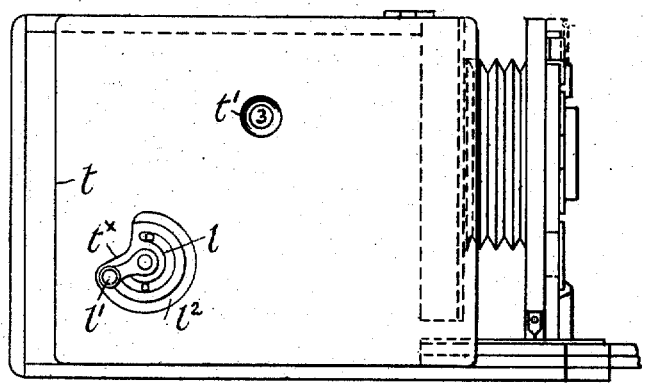
Figure 4:
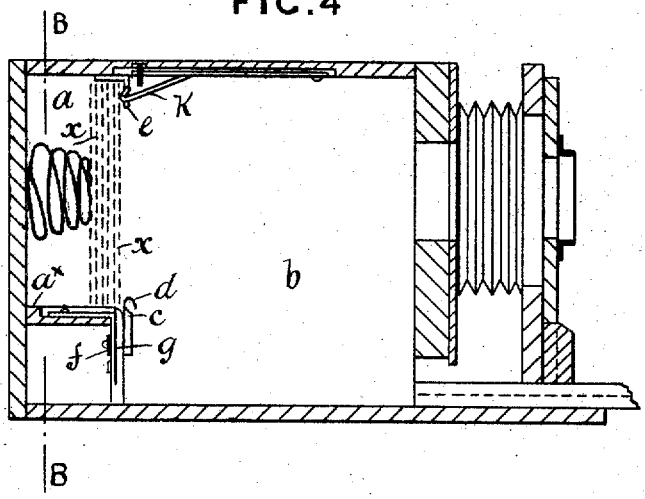
Figure 5:
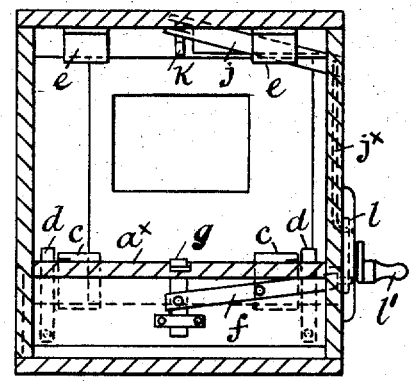

In the accompanying two sheets of drawings illustrating my said invention, and to which I hereinafter refer, Figure 1 is a front elevation, and Fig. 2 an elevation, of the operating side of my improved photographic camera. Fig. 3, Sheet 2, is an elevation of the same side with the cover removed. Fig. 4 is a longitudinal section. Fig. 5 is a transverse section on line B B. Fig. 6 is an elevation with camera-front removed, showing the shutter. Fig. 7 is an end view of the shutter, showing the disengaging mechanism.

In the views the same characters refer to like parts.

According to this invention I form the back of a camera such as herein first named with a rectangular chamber, as $a$, that may contain one dozen or other preferred number of plates or films in sheaths. The floor $a^x$ of this chamber is raised above the floor of the depository-chamber $b$, into which the sheaths, with the plates or films, are caused to fall after a picture has been taken. This is effected by fixing on the inner edge of the chamber $a$, in which the plates or films are placed before exposure, a shallow ridge or ridges, as $c\ c$, projecting slightly upward from the floor of said chamber, and on the inner side of or near one end of each of said ridges I fit a small vertical spring, as $d$, which projects a little above the ridges and presses against either the ridges or the inner edge of the floor of the chamber. I fit corresponding ridges $e\ e$ to the under side of the roof of this chamber and parallel with the ridges $c$. I pivot a lever, as $f$, extending transversely from one side to the center of the chamber in proximity and parallel to the hereinbefore-described ridges $c$, and on the inner end of said lever I form or fix vertically a narrow plate $g$, that is beveled on the inner side, so as to project into the chamber $b$ a little beyond the inner faces of the ridges $c$, and which can be raised above or lowered below the level of the floor of the chamber $a$ by the action of the lever $f$. I pivot a corresponding lever $j$ in like position in the roof of the camera, said lever raising or lowering a beveled plate $k$. The free ends of these levers extend to one side of the camera and are actuated by a cam, as $l$, that is moved by a handle, as $l'$.

Before the sheaths $x$, with the plates or films, are put in the chamber $a$ the handle $l'$ is turned down and toward the back of the camera until it meets a stop, which can be $t^x$, formed by the shape of the aperture in the cover $t$, the cam $l$ thereby causing the levers $f$ and $j$ to withdraw the vertical plates $g$ and $k$ and the front sheath to be pressed closely by a spring, as $m$, against the ridges $c$ and $e$ at the top and bottom of the chamber. When the handle $l'$ is turned toward the front of the camera until it is at or about a horizontal position, the plate $g$ raises the bottom edge of the front sheath over the ridges $c$; but said sheath is prevented from falling into the chamber $b$ by the springs $d$. By continuing the turn of the handle in an upward direction the plate $k$ presses the upper edge of the front sheath below the ridges $e$ and the bottom edge of said sheath between the ridges $c$ and springs $d$, when it falls forward into the depository-chamber. The handle $l'$ is then brought back to its original position, which causes the plates $g$ and $k$ to recede, thereby permitting the next sheath to occupy the place from which the sheath containing the plate or film on which the picture has been taken has by these means been removed.

When the handle $l'$ is turned and releases a sheath, a catch or ratchet, as $p$, is caused to engage with the ratchet-teeth $q'$ on the periphery of the dial $q$ by said catch or ratchet $p$ being either connected to the handle $l'$ or attached to the rod $j^x$, that is connected to the lever $j$, which is actuated by the cam $l$ in the manner hereinbefore described, said dial being thereby moved forward one tooth and the number indicated either by a pointer or coming opposite an aperture $t'$ in the cover $t$, said catch or ratchet $p$ passing freely over the ratchet-teeth $q'$ when the handle $l'$ is turned back. The spring-blind 1 is wound on the spring-roller 8 simultaneously with the discharge of the sheath into the depository-chamber $b$ by the cord $l^4$, that is connected to the wire $l^3$, which when the handle $l'$ is turned toward the front of the camera is wound on the grooved pulley $l^2$. I form a shutter in which the aperture 2 in the spring-blind is caused to be covered while passing the lens when the blind is being rewound by fitting a stud or catch 3 on the blind over the aperture, said catch engaging with a catch 4 on the screen 5 and drawing said screen up with the blind, thereby covering the aperture in the blind until said aperture has passed the lens, when the catch 4 on the screen is pressed off the catch 3 on the blind by a pin 6 or an equivalent fixed in the frame of the shutter and the screen drawn down and rewound on the spring-roller 7 in the bottom of the shutter.

I obtain either instantaneous or prolonged exposure by means of twin levers 10 and 11, the lever 11 arresting the blind in its descent when prolonged exposure is required, so that the aperture in the blind remains for a period opposite the lens. This is effected by a stop 9, that is fixed on one end of the spindle of the top blind-roller 8, engaging successively with the levers 10 and 11. When the blind is coiled onto the roller ready for an exposure and the lever 11 is moved to the side of the lever 10, the stop 9 is resting against the lever 10 and prevents the blind unrolling. When the bulb 13 is pressed, both levers are moved outward, the stop 9 is disengaged from the lever 10, passes through the space 12, rotates with the spring-roller, and engages with the lever 11 and remains engaged therewith, and causes the aperture in the blind to remain opposite the lens until the pressure on the bulb is released, when the stop will pass through the space 12 and the blind close over the lens.

When instantaneous exposure is required, the lever 11 is moved back out of the path of the stud or stop 9, as shown in Fig. 7, and the stop then only engages with the lever 10, which is operated in the manner hereinbefore described.

I claim as my invention—

1. In a photographic camera, the combination of a device for removing a plate or a film after a picture has been taken and successively placing another plate or a film in position for the next exposure consisting of a ridge on the floor and a corresponding ridge on the under side of the roof of the chamber in which the plates are placed ready for exposure, vertical springs pressing against the inner edge of the floor, a lever in proximity and parallel to said top and bottom ridges, a beveled plate on each of said levers, a cam for actuating said levers, a catch or ratchet operated by said levers and engaging with ratchet-teeth on a dial, a blind and a screen therefor, and means for lifting the blind and screen together and placing the blind on the top roller ready for the next exposure at the time of changing the plate from a common operating means.

2. A camera having rollers in front of the lens, a blind with an aperture and a catch 3, a screen below the blind having a catch 4, means for moving the blind for an exposure so that the catches will engage after said exposure and travel together upon the opposite travel of the blind, and means for disengaging the catches upon raising the blind the proper distance.

In testimony whereof I have signed my name to this specification in the presence of two subscribing witnesses.

JAMES MILLARD.

Witnesses:
 JNO. HUGHES,
 J. ERNEST HUGHES.